United States Patent [19]

Shaw et al.

[11] Patent Number: 4,717,450
[45] Date of Patent: Jan. 5, 1988

[54] REMOVAL OF CHLORIDE FROM PROCESS SOLUTIONS

[75] Inventors: John M. Shaw, Toronto; Colin W. Oloman, Vancouver, both of Canada

[73] Assignee: University of British Columbia, Vancouver, Canada

[21] Appl. No.: 767,169

[22] Filed: Aug. 19, 1985

[51] Int. Cl.⁴ .................... D21C 11/00; C02F 1/46
[52] U.S. Cl. .................... 162/29; 162/30.11; 162/43; 204/151; 204/182.4; 210/928
[58] Field of Search .................... 162/29, 30.1, 30.11, 162/31, 43, 17, 85; 204/151, 153, 182.3, 182.4, 182.5, 186, 93, 94; 210/928

[56] References Cited

U.S. PATENT DOCUMENTS

| | | | |
|---|---|---|---|
| 2,741,591 | 4/1956 | Dewey et al. | 204/182.4 |
| 2,800,445 | 7/1957 | Clarke | 204/182.4 |
| 3,975,246 | 8/1976 | Eibl et al. | 204/151 |
| 3,986,951 | 10/1976 | Fremont | 162/29 |
| 4,049,490 | 9/1977 | Zaplatin et al. | 204/182.3 |
| 4,124,458 | 11/1978 | Moeglich | 204/182.3 |
| 4,162,187 | 7/1979 | Smith et al. | 162/29 |
| 4,207,157 | 6/1980 | Hirai et al. | 204/94 X |
| 4,210,502 | 7/1980 | Watanabe et al. | 204/182.4 |
| 4,596,641 | 6/1986 | Bridger et al. | 204/151 |

FOREIGN PATENT DOCUMENTS 55-22051  2/1980  Japan .................... 162/30.1

Primary Examiner—S. Leon Bashore
Assistant Examiner—Andrew J. Anderson
Attorney, Agent, or Firm—Spensley Horn Jubas & Lubitz

[57] ABSTRACT

A method of removing chloride ions in preference to oxidized sulfur ions, in particular sulfate or thiosulphate ions from a process solution containing either or both, or sulfide ions which are first oxidized to sulfate or thiosulphate ions. The method utilizes an electrochemical reactor having an anode and a cathode, disposed in respective anode and cathode compartments, separated by an ion selective separator, typically an anion exchange membrane. The process solution acts as the catholyte and is placed or flowed through the cathode chamber while simultaneously, an electrically conducting anolyte is placed or flowed through the anode chamber. A sufficient current density is maintained between the anode and the cathode, which at any time is not substantially greater than, and is preferably equal to, that which corresponds to the maximum chloride flux through the reactor membrane at the time. With this condition maintained, chloride ions pass through the membrane of the reactor in preference to oxidized sulphur anions.

3 Claims, 3 Drawing Figures

REMOVAL OF CHLORIDE FROM PROCESS SOLUTIONS

FIELD OF THE INVENTION

This invention relates to a method for removing chloride from a process solution containing oxidized sulfur anions in particular from a spent cooking liquor from a chemical pulping process for fibrous cellulosic material such as Kraft black liquor from wood pulping.

DESCRIPTION OF PRIOR ART

Removal of chloride ions from process solutions containing oxidizing sulfur anions, in particular sulfate and thiosulfate ions, is a procedure which has particular application to spent cooking liquor from a chemical pulping process for fibrous cellulosic material (eg. wood). Such liquor typically contains 20 to 25 g/l of chloride, and in some pulping plants can be as high as 40 g/l. The presence of chloride in such liquor is undesireable, since it promotes equipment corrosion and causes a solids burden problem within the smelting/solidification equipment. In addition, recycling procedures used in a typical pulping process, concentrate chloride salts along with residual pulping chemicals, thereby exacerbating problems caused by the presence of chloride.

Chloride salts are introduced into spent pulping liquor from a number of sources, including from raw cellulosic fibrous material, raw water, and commercial grade pulping chemicals. Much of the chloride present in the raw cellulosic fibrous material is present as a result of transportation of logs through sea water. Another source of relatively large amounts of chloride in pulping liquor is from bleach plant effluent from pulp production. Such effluent is often used as a raw water source for the pulping process, in order to cut mill water consumption in half, and reduce mull outfalls to comply with more restrictive pollution control guidelines. Such effluent contains substantial quantities of chloride salts, principally in the form of sodium chloride produced as a bleaching by-product, sufficient to increase chloride loadings in the pulp process by approximately ten fold.

A number of schemes have been developed to reduce chloride levels in spent cooking liquors from a pulp process, which involve crystallization. Such schemes are disclosed in U.S. Pat. Nos. 3,945,880 to Lukes et al.; 3,909,344 to Lukes; 3,954,552 to Lukes et al.; 3,746,612 to Rapson et al.; and 3,833,462 to Moy et al. Such crystallization schemes involve some loss of active pulping chemicals, and cannot be economically retrofitted to existing mills. U.S. Pat. Nos. 3,996,097 to Willard, and 4,000,034 to de Vere Partridge et al. on the other hand, disclose methods wherein chloride salts are removed from the precipitator catch through different combinations of standard precipitation and crystallization techniques. These latter two methods require high residual chloride levels in the plant liquors to be effective. In addition, chloride induced corrosion of the chloride removal equipment utilized in the latter two methods, has been identified as a problem with those methods.

It is desirable then, to have a method of removing chloride from a process solution containing sulfate and thiosulfate, in particular from a spent cooking liquor from a chemical pulping process. Such method should remove chloride in preference to sulfate and thiosulfate ions, so that these are not substantially depleted from a pulping plant's cooking liquor, and are available for recycling in the pulping process. The process should also preferably be readily retrofitted to existing mills, and not result in severe corrosion problems in the equipment required, and should be capable of operating while maintaining relatively low chloride levels in the process solution.

SUMMARY OF THE INVENTION

A method is provided of removing chloride ions, in preference to oxidized sulfur anions, from a process solution which contains chloride and oxidized sulfur anions, particularly sulfate or thiosulphate anions. The method utilizes an electrochemical reactor which has an anode and a cathode, disposed in respective anode and cathode compartments, separated by an ion selective separator, such as an anion exchange membrane. The method requires placing the process solution in, or flowing it through, the cathode chamber, while simultaneously placing an electricity conducting anolyte in, or flowing it through, the anode chamber. A current density is maintained, which current density at any given time should not be substantially greater than that which corresponds to the maximum chloride flux through the separator at that time. Preferably, the process solution and anolyte are aqueous, with the process solution further preferably being spent cooking liquor from a chemical pulping process.

The method is particularly useful where chloride ion concentration in the process solution is at least 1 g/l. It is also preferred that the pH of the anolyte entering the anode compartment is no greater than about 13. The current density is preferably maintained at between 500 to 5,000 amps $m^{-2}$, this figure being the superficial current density measured at the separator membrane. Furthermore, the current density is preferably substantially equal to that which corresponds to the maximum chloride flux through the reactor separator at any time.

The method may also be applied to removing chloride ions from a spent cooking liquor from a pulp mill which liquor contains sulfide ions. In this case, the sulfide ions in the spent cooking liquor are first oxidized to oxidized sulfur anions, specifically to sulfate or thiosulphate ions. The method preferably also additionally comprises at least partially neutralizing a basic outfall from the pulp mill, by mixing the anolyte leaving the anode chamber with the mill outfall. In this case, the anolyte entering the anode compartment has a sufficiently low pH and is flowed through the anode compartment at a sufficiently low rate, such that when it leaves the anode compartment it is acidic.

The method involves removing chloride anions from an aqueous process solution such as a spent cooking liquor obtained from a Kraft or sulfite wood pulping process comprising: passing the solution as a catholyte through an electrochemical reactor having an anode and a cathode separated solely by an anion selective separator means, the anolyte of the reactor being another suitable conductive aqueous solution; and applying an electric potential difference between the anode and the cathode to thereby cause the chloride anions in the catholyte to pass through the separator means into the anolyte and generate corresponding hydroxyl ions at the cathode which are incorporated into the catholyte.

DRAWINGS

Specific embodiments of the invention will now be described with reference to the drawings, in which:

FIG. 1 is a schematic view showing an apparatus constructed to perform the method of the present invention; and FIGS. 2 and 3 graphically illustrate some parameters of operation of the method of the present invention, utilizing the apparatus shown in FIG. 1.

DETAILED DESCRIPTION OF EMBODIMENTS OF THE INVENTION

Figure 1:
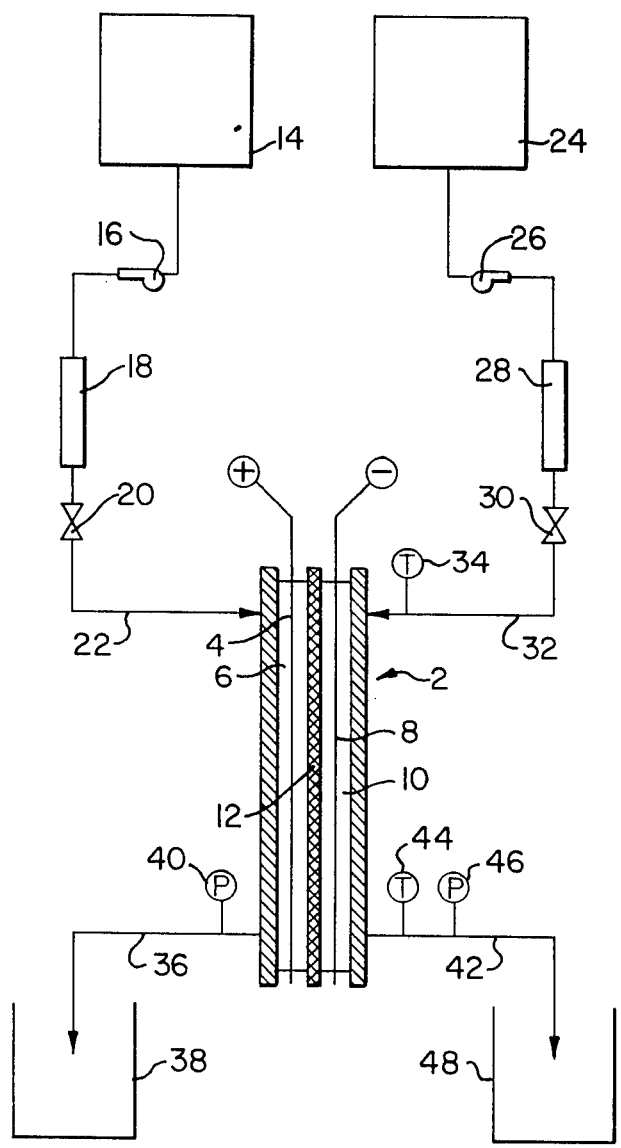

Referring first to FIG. 1, the apparatus shown consists of an electrochemical reactor 2 having an anode 4 disposed in anode compartment 6, which anode 4 can be constructed of platinum-iridium coated titanium plate. Reactor 2 also has a cathode 8 disposed in cathode compartment 10, which cathode 8 can be constructed of 316 stainless steel plate. Anode and cathode compartments 6, 10 respectively, are separated by an anion exchange membrane 12. The internal dimensions of the foregoing reactor were:

electroce chamber depth—0.002 m
electrode height—1.00 m
electrode width—0.020 m

In operation of reactor 2, catholyte, consisting of black liquor containing chloride ions and oxidized sulphur anions (sulfate and thiosulfate), is fed to reactor 2 from catholyte storage tank 24, by means of pump 26. If the black liquor contains sulfide ions, the sulfide ions must first be oxidized (to sulfate or thiosulfate) to prevent polysulfide formation at cathode 8, during operation of reactor 2 as will be described. The catholyte first passes through flow meter 28, flow control valve 30, and then through line 32 into reactor 2, with gauge 34 sensing the temperature thereof. Likewise, anolyte, consisting of a dilute sodium hydroxide solution, is fed to reactor 2 from anolyte storage tank 14, by pump 16, through flow meter 18, flow control valve 20, and line 22, and into reactor 2. During operation of reactor 2, catholyte and anolyte exit as catholyte and anolyte effluent flows, through lines 42 and 36 respectively, and hence into respective effluent receiving vessels 48 and 38. Pressure sensor 40 measures the pressure of the effluent anolyte, while temperature and pressure sensors 44 and 46 respectively, measure the temperature and pressure of the effluent catholyte.

Figure 2:
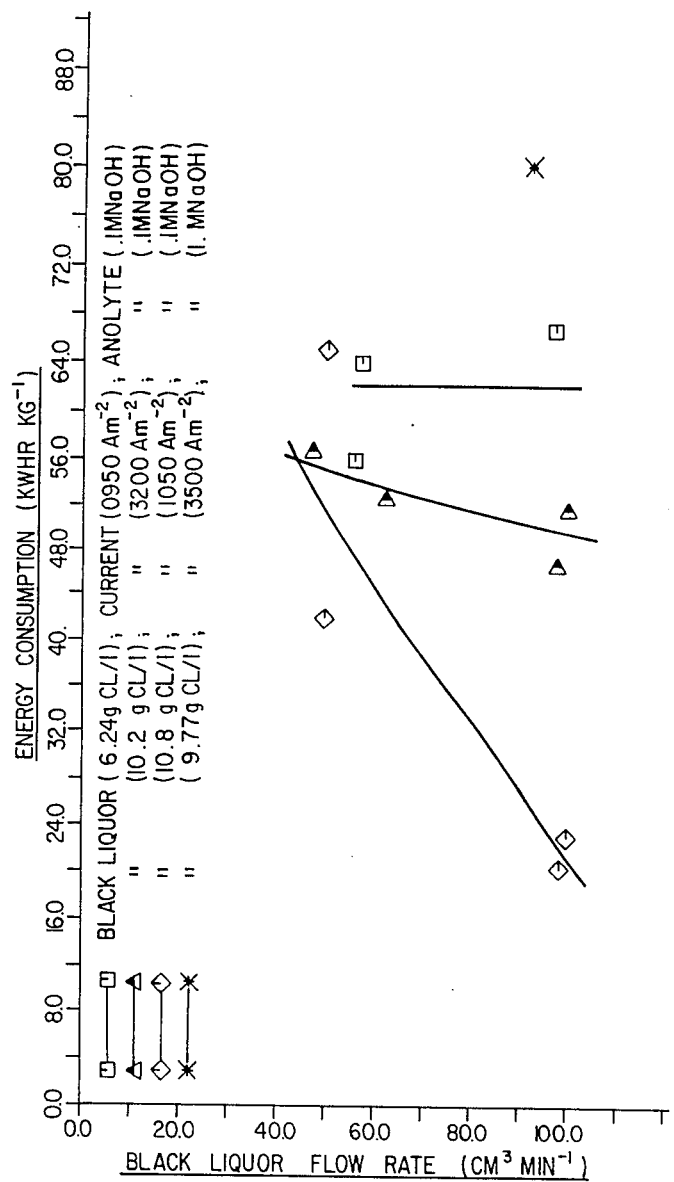

The above reactor 2, was used in the manner described, during a number of trials, with process parameters and process results as specified in Tables 1–3 below. The results obtained in Table 3 though, were with use of a simulated black liquor solution, that is an aqueous solution of sodium chloride and sodium hydroxide only. FIG. 2 plots the results obtained from specified trials in Tables 1 and 2, on the basis of energy consumption, as kwhr/kg (of chloride as NaCl) as a function on black liquor flow rate, while FIG. 3 for the same data, graphically illustrates chloride mass flux (on the basis of kg of chloride per square meter, per second) as a function of black liquor flow rate.

Referring first to the graph of FIG. 2, it will be seen that as black liquor flow rate is increased, the energy efficiency for chloride transfer also increases, with the rate of increase in efficiency (ie. the rate of decrease in energy consumption) as a function of flow rate, being greater in general with higher chloride concentrations. This effect of flow rate is likely due to the fact that an increased flow rate of black liquor (catholyte) results in a higher average chloride concentration, improved mass transfer and lower gas hold-up in the cathode compartments. Of course, as is also illustrated by FIG. 2, generally the lower the chloride concentration, the higher the energy consumption. Thus, from the point of view of energy efficiency, the chloride concentration should preferably be high, with the black liquor flow rate also being kept high. Of course, the higher the black liquor flow rate, the less overall reduction in chloride concentration will likely occur, with other factors remaining the same. Thus, energy efficiency must be balanced with consideration of the required chloride concentration in the catholyte effluent.

TABLE 1

| Trial No. | OBL[3]Cl— content(gl[-1]) | Flow rates (cm³ min[-1]) Anolyte[1] | Catholyte | Reactor Outlet Temp (C.) | Inlet Pressure Psig Anode Chamber | Cathode Chamber | Voltage (V) | Current Amps |
|---|---|---|---|---|---|---|---|---|
| 1 | 10.810 | 50 | 50 | 75 | 6 | 10 | 21.4 | 30 |
| 2 | 10.810 | 100 | 100 | 64 | 9 | 10 | 21.7 | 22 |
| 3 | 10.810 | 50 | 100 | 70 | 4 | 10 | 21.9 | 21 |
| 4 | 10.810 | 50 | 200 | 54 | 4 | 15 | 22.3 | 20 |
| 5 | 10.810 | 100 | 50 | 60 | 6 | 3 | 21.6 | 20 |
| 6 | 6.240 | 50 | 56 | 52 | 5 | 20 | 22.3 | 18 |
| 7 | 6.240 | 100 | 197 | 60 | 8 | 26 | 22.0 | 23 |
| 8 | 6.240 | 50 | 98 | 64 | 6 | 9 | 22.0 | 19 |
| 9 | 6.240 | 50 | 57.2 | 70 | 6 | 5 | 22.0 | 20 |
| 10 | 9.770 | 100[2] | 92.2 | 100 | 22 | 23 | 18.1 | 70 |
| 11 | 10.200 | 50 | 62.6 | 94 | 3 | 30 | 18.0 | 68 |
| 12 | 10.200 | 100 | 101 | 94 | 3 | 30 | 18.1 | 66 |
| 13 | 10.200 | 50 | 98.5 | 90 | 3 | 20 | 18.3 | 62 |
| 14 | 10.200 | 100 | 47.0 | 92 | 4 | 30 | 18.3 | 60 |

[1]Anolyte comprises .1 M NaOH except where noted (run no. 10)
[2]Anolyte comprises 1 M NaOH
[3]OBL = oxidized black liquor

TABLE 2

| Trial No. | % Chloride Removal | Current Efficiency moles Cl—/mole e[-] | Energy Consumption Kwhr/Kg(NaCl)[-1] | Chloride Mass flux (Kg(Cl—) m[-2]s[-1] × 10⁴ |
|---|---|---|---|---|
| 1 | 18.5 | 0.15 | 64.9 | 0.83 |
| 2 | 20.2 | 0.45 | 22.1 | 1.82 |

TABLE 2-continued

| Trial No. | % Chloride Removal | Current Efficiency moles Cl—/mole e⁻ | Energy Consumption Kwhr/Kg(NaCl)⁻¹ | Chloride Mass flux (Kg(Cl—) $m^{-2}s^{-1} \times 10^4$ |
|---|---|---|---|---|
| 3 | 21.7 | 0.51 | 19.8 | 1.95 |
| 4 | 19.3 | 0.24 | 41.9 | 0.87 |
| 5 | 20.8 | 0.20 | 55.8 | 0.60 |
| 6 | 10.42 | 0.15 | 66.3 | 0.53 |
| 7 | 19.5 | 0.17 | 63.8 | 0.50 |
| 8 | 31.3 | 0.10 | 79.7 | 1.34 |
| 9 | 36.8 | 0.16 | 52.7 | 1.95 |
| 10 | 23.0 | 0.16 | 51.0 | 1.97 |
| 11 | 24.8 | 0.18 | 46.0 | 2.07 |
| 12 | 41.0 | 0.15 | 56.5 | 1.64 |

TABLE 3

Results with Simulated Black Liquor

| Trial No. | Inlet Catholyte Cl⁻ content g/l | Flow Rates (cm³/min) Anolyte[1] | Flow Rates (cm³/min) Catholyte[2] | Reactor Temp. °C. | Pressure (Psig) A | Pressure (Psig) C | Voltage (V) | Current Amps | Chloride Mass Flux Kg $m^{-2}s^{-1} \times 10^4$ | Current Efficiency for for Cl—(%) |
|---|---|---|---|---|---|---|---|---|---|---|
| 15 | 7.0 | 200 | 50 | 84 | 7 | 0 | 18.1 | 80 | 2.10 | 14.4 |
| 16 | 3.5 | 200 | 50 | 80 | 12 | 3 | 18.2 | 60 | 0.63 | 5.8 |
| 17 | 1.45 | 200 | 50 | 74 | 14 | 2 | 17.9 | 44 | 0.28 | 3.5 |
| 18 | 3.5 | 200 | 100 | 76 | 12 | 3 | 18.5 | 60 | 0.79 | 7.3 |
| 19 | 3.5 | 200 | 200 | 70 | 12 | 5 | 18.4 | 60 | 0.76 | 7.0 |
| 20 | 7.0 | 200 | 100 | — | 12 | 7 | 16.6 | 80 | 2.30 | 15.8 |
| 21 | 7.0 | 200 | 200 | 75 | 15 | 20 | 16.5 | 80 | 2.50 | 17.2 |
| 22 | 1.45 | 200 | 200 | 58 | 14 | 9 | 18.2 | 44 | 0.29 | 3.6 |
| 23 | 1.45 | 50 | 200 | 80 | 7 | 7 | 20.1 | 44 | 0.35 | 4.4 |

[1].1 M NaOH
[2]1.0 M NaOH

Figure 3:
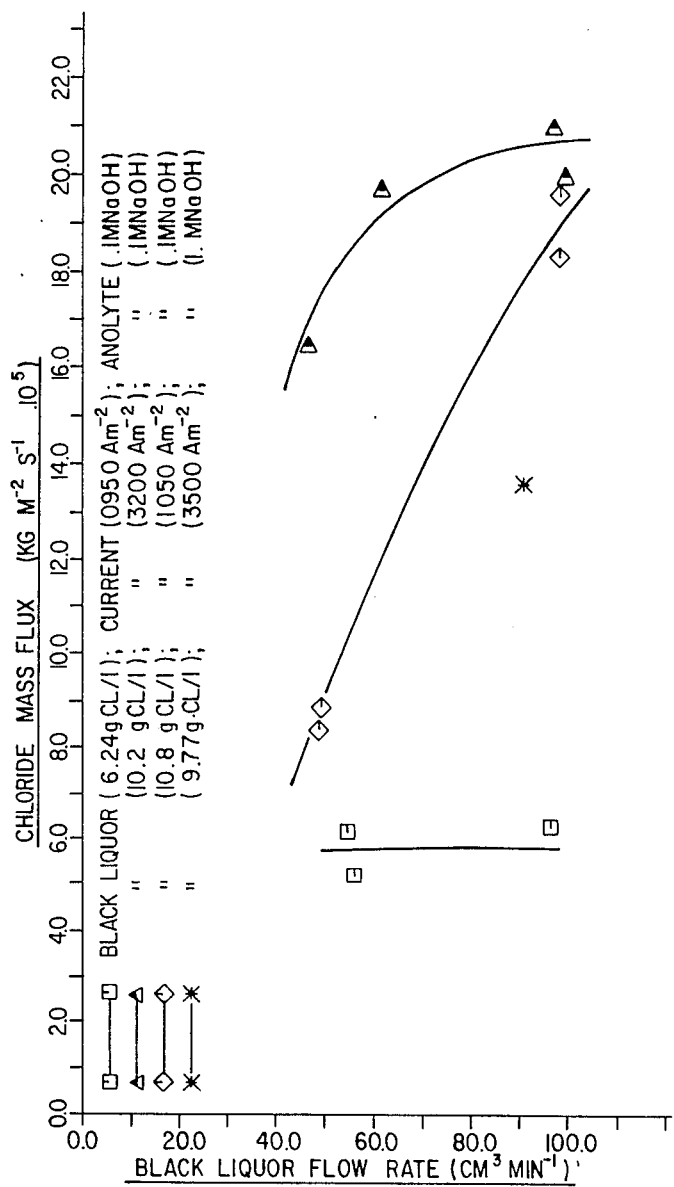

Referring to FIG. 3, it will be seen in general that as the catholyte flow is increased, for a given initial chloride concentration in the liquor entering the cathode compartment, the chloride flux through anion membrane 12 appears to reach a maximum, which maximum is more rapidly reached with lower initial chloride concentrations in the black liquor. This effect appears to be due to improved mass transfer conditions within the cathode compartment, resulting in a higher chloride mass flux across membrane 12. Normally, one would select the desired black liquor flow rate, bearing in mind the effect such will have on energy consumption and percent chloride removal as already discussed, and adjust the current density such that it is no greater than, and preferably equal to, that which corresponds to the maximum chloride flux through reactor membrane 12 during the operation of the reactor 2. It has been found that provided such current density, for a given set of other parameters, does not exceed that which corresponds to the maximum chloride flux through the reactor membrane, the transfer efficiency of chloride ions far exceeds that of oxidized sulfur anions, such as sulphate ($SO_4^{-2}$) and thiosulphate ($S_2O_3^{-2}$). The concentrations of oxidized sulphur anions are difficult to measure at low values, and hence it was only possible to obtain two data points for transfer of these ions, namely for trials numbers 4 and 7 in Table 1. As will be seen from the changes in other parameters in the trials of Table 1, these points are quite representative of oxidized sulfur anion change transfer efficiency for the remainder of the trials in that Table. The results obtained for trials 4 and 7 disclose that oxidized sulphur anion charge transfer efficiency was approximately 5% to 15%. On the other hand, chloride charge transfer efficiencies of over 50% were observed under similar conditions. Thus, the mole ratio of chloride removal to oxidized sulphur anion removed from the catholyte is between 7:1 and 13:1 even though operation of the method in the above trial has not been optimized.

It will also be seen from FIGS. 2 and 3, and Table 3, that specific energy consumption (i.e. energy consumed per mass of chloride transferred) decreases as the maximum chloride flux through the reactor membrane is approached, under a given set of conditions. Furthermore, such limiting chloride flux appears to be a function of chloride concentration, and is approximately proportional to the cube of the chloride concentration in the catholyte, provided the current density corresponds to the maximum chloride flux through the reactor under those conditions (ie. equals the maximum charge density transfer rate for the chloride transfer under those conditions). Thus, these factors again indicate that it will be preferable to perform the method with a sufficient current density, which corresponds to the maximum chloride flux through the reactor membrane under a given set of conditions. In addition, it would again be preferrable to utilize a liquor with a higher chloride concentration to maximize energy efficiency. However, as illustrated in Table 3, significant chloride ion transfer will still occur with chloride concentrations approaching as low as one gram per liter in a simulated process liquor.

Other factors which significantly effect the method include the pH of the anolyte. Comparing trials 12 and 10, from the point of view of minimum energy consumption and maximum chloride mass flux, a pH of 13 or less would appear to be desirable. A lower initial pH of the anolyte is further desirable from the point of view that the effluent anolyte may be made to be slightly acidic. This is as a result of the following reactions which can take place within the anode compartment, depending upon the pH:

$$2OH^- \rightarrow H_2O + \tfrac{1}{2}O_2 + 2e^- \qquad (1)$$

$$H_2O \rightarrow 2H^+ + \tfrac{1}{2}O_2 + 2e^- \qquad (2)$$

Reaction (1) occurs under alkaline conditions whereas reaction (2) occurs in an acidic anolyte. The pH of the anolyte effluent will of course be determined by such factors as current density, chloride mass flux, and anolyte flow rate (and hence residence time within the anode compartment). When these factors are adjusted such that the effluent anolyte is slightly acidic, such effluent anolyte can be mixed with a typical, somewhat basic, pulp mill outfall, in order to at least partially neutralize it and thereby reduce a pollution problem.

It should be noted that the reaction in the cathode compartment 10 of reactor 2 during operation of the above method, is as follows:

$$e^- + H_2O \rightarrow \tfrac{1}{2}H_2 + HO^- \qquad (3)$$

Thus, the effluent catholyte is more basic than it was then it initially entered cathode compartment 10. In order to make up for sulfide loss in the Kraft process, and at least partially neutralize the excess basicity in the effluent catholyte, sulfuric acid can be added to the basic cathode effluent, with the following resulting reactions:

$$2NaOH + H_2SO_4 \rightarrow Na_2SO_4 + 2H_2O \qquad (4)$$

$$Na_2SO_4 \rightarrow Na_2S + 2O_2 \qquad (5)$$

Reaction (5) takes place in the recovery furnace. Alternatively, other sulfur containing compounds that will neutralize the excess basicity of the cathode effluent could be used, such as $SO_2$, $H_2S$, or sulfur. Such compounds can be added to a process stream in the pulping process which is at least partially derived from effluent from the cathode compartment, to at least partially neutralize excess basicity resulting therefrom and balance sulfidity in the cooking liquor.

It will be apparent, from the above, that chloride ion can be removed by the above method from spent cooking liquor, in considerable preference over oxidized sulphur anions which exist in the spent liquor at considerably greater concentrations than the chloride. The method for any particular installation can be optimized by selecting the desired anolyte and catholyte flow rates, and adjusting the current density so as to correspond to the maximum chloride flux through the reactor membrane, under the remaining selected conditions. It will also be appreciated that hydrogen produced in cathode compartment 10 of reactor 2 can be burned to generate process heat, while oxygen generated in anode compartment 6 can be utilized as a pulp bleaching agent or as a liquor oxidation agent.

As will be apparent to those skilled in the art in light of the foregoing disclosure, may alterations and modifications are possible in the practice of this invention without departing from the spirit or scope thereof. Accordingly, the scope of the invention is to be construed in accordance with the substance defined by the following claims.

I claim:

1. A method of removing chloride ions from a spent cooking liquor from a pulp mill, containing sulfide ions and at least 1 g/l chloride ions, utilizing an electrochemical reactor having an anode and a cathode, disposed in respective anode and cathode compartments separated solely by an anion selective separator means, the method comprising:
    (a) first oxidizing essentially all of the sulfide ions in the spent cooking liquor to oxidized sulphur anions; then
    (b) flowing the spent cooking liquor through the cathode compartment of the reactor as the catholyte while simultaneously flowing an aqueous electrically conducting solution through the anode compartment as the anolyte; and
    (c) maintaining a current density in a range of about 500 to 5,000 amp/m² between the anode and the cathode, to cause the chloride anions in the catholyte to pass through the anion exchange membrane into the anolyte and generate corresponding hydroxyl ions at the cathode which are incorporated in the catholyte.

2. A method as described in claim 1 wherein the spent cooking liquor is obtained from a Kraft or sulfite wood pulping process.

3. A method as described in claim 1 wherein the pH of the anolyte entering the anode compartment is no greater than about 13.

* * * * *